United States Patent [19]

Purvis et al.

[11] Patent Number: 4,909,626

[45] Date of Patent: Mar. 20, 1990

[54] ELECTRICALLY-CONTROLLABLE THIN FILM FRESNEL ZONE DEVICE

[75] Inventors: Alan Purvis, Durham; Michael G. Clark, Gerrards Cross, both of Great Britain

[73] Assignee: The General Electric Company, p.l.c., United Kingdom

[21] Appl. No.: 344,059

[22] Filed: Apr. 27, 1989

Related U.S. Application Data

[63] Continuation of Ser. No. 78,220, Jul. 27, 1987, abandoned.

[30] Foreign Application Priority Data

Jul. 28, 1986 [GB] United Kingdom ............... 8618345

[51] Int. Cl.⁴ .................... G01J 3/06; G01J 3/14; G02F 1/133
[52] U.S. Cl. .................................. 356/332; 350/336; 350/347 V; 350/379
[58] Field of Search ............ 356/332; 350/336, 347 V, 350/379, 452

[56] References Cited

U.S. PATENT DOCUMENTS

| | | | |
|---|---|---|---|
| 3,402,001 | 9/1986 | Fleisher | 350/379 |
| 3,588,225 | 6/1971 | Nicastro | 350/336 X |
| 3,653,742 | 4/1972 | Buchan . | |
| 4,367,916 | 1/1983 | Mottier et al. | 350/452 X |
| 4,572,616 | 2/1986 | Kowel et al. | 350/347 V |
| 4,601,545 | 7/1986 | Kern | 350/347 V |
| 4,606,612 | 8/1986 | Iizuka | 350/347 V |
| 4,639,091 | 1/1987 | Hulgnard et al. | 350/347 V |

FOREIGN PATENT DOCUMENTS

| | | |
|---|---|---|
| 0121449 | 10/1984 | European Pat. Off. . |
| 2325954 | 4/1977 | France . |
| 8505466 | 12/1985 | PCT Int'l Appl. . |
| 1026318 | 4/1966 | United Kingdom . |
| 1061257 | 3/1967 | United Kingdom . |
| 1193228 | 5/1970 | United Kingdom . |

OTHER PUBLICATIONS

Hirsch et al., "Scanning Monochromator" IBM Tech. Disc. Bulletin, vol. 12, No. 11, Apr. 1970, pp. 1806.
Patent Abstracts of Japan, vol. 10, No. 6, A-6.020402 (Matsushita Denki Sangyo K.K.). IEEE Transactions of Elctron Devices, col. Ed-26, No. 11, Nov. 79, pp. 1734-1737, Hori et al., "Field-Controllable Liquid Crystal Phase Granting".

*Primary Examiner*—Vincent P. McGraw
*Attorney, Agent, or Firm*—Kirschstein, Ottinger, Israel & Schiffmiller

[57] ABSTRACT

An optical component comprises a thin film of an electrically controllable birefringent material confined between substantially planar surfaces. A respective electrode structure is provided on each of the surfaces, each electrode structure being patterned such that an electric field applied across the film by means of electrode structures, when a voltage is applied therebetween, causes modulation of the refractive index of the material such that the wavefront of electromagnetic radiation incident of the component and transmitted through the thin film is divided into Fresnel zones.

13 Claims, 3 Drawing Sheets

ELECTRICALLY-CONTROLLABLE THIN FILM FRESNEL ZONE DEVICE

This is a continuation of application Ser. No. 07/078,220 filed July 27, 1987, now abandoned.

BACKGROUND OF THE INVENTION

This invention relates to optical components. Optical components, for example lenses, prisms and beam deflectors, are normally made from one or more pieces of refractive, optically transparent material shaped such that the variation in optical path length across the wavefront transmitted by the component of light incident on the component produces the required changes in direction of that wavefront.

The optical parameters of an optical component, for example the focal length of a lens, is normally fixed by the characteristics of the material forming the component, together with the shape of the component. In some applications it would, however, be useful to have the ability to change said optical parameters of an optical component by application of electrical signals to the component. In recent years a number of optical components incorporating liquid crystals have been developed in order to achieve electrically controllable optical parameters. In Applied Optics, volume 23, pages 2774–2777 published August 1984 there is described a spherical lens comprising a cascade of two liquid crystal cells each comprising a thin film of nematic liquid crystal confined between two thin glass plates each carrying a transparent electrode. By application of electric fields across the films, a spatial variation in refractive index across each film may be achieved. As, however, the maximum change in optical path length across each film is dependent on the thickness of the film and this thickness is in turn limited by the required transmission of incoming light through the cells and the required response time, only components of very low optical power are possible using this approach.

An attempt to overcome this problem is described in Japanese Journal of Applied Physics, volume 24, pages L626–L628, published August 1985. This article describes a variable-focus lens in which a concave Fresnel lens is used as one wall of a liquid crystal cell, such that the variable-focus lens exhibits the composite focal length of the lens constituted by the liquid crystal and the Fresnel lens. Such a variable-focus lens suffers the disadvantage however that the coarse serrations of the Fresnel lens cause the individual zones of the liquid crystal cell to be too wide and too deep, giving poor focus adjustment and a slow response time, typically over three seconds. Furthermore, the focussing power of such a variable-focus lens cannot be reduced to zero.

SUMMARY OF THE INVENTION

It is an object of the present invention to provide an optical component in which the optical parameters of the component are controllable by application of electrical signals to the component.

According to the present invention there is provided an optical component comprising a thin film of an electrically controllable birefringent material confined between substantially planar surfaces; a respective electrode structure on each of said surfaces, each electrode structure being patterned such that an electric field applied across the thin film by means of the electrode structures when a voltage is applied therebetween causes modulation of the refractive index of the material such that the wavefront of electromagnetic radiation incident on the component and transmitted through the thin film is divided into Fresnel zones.

The material is preferably a liquid crystal material.

In one particular component in accordance with the invention, the thin film and the electrode structures are such that, on application of the electric field, alternate Fresnel zones are nontransmissive to the incident radiation such that the component constitutes a zone plate.

In another particular component in accordance with the invention the thin film and the electrode structure are such that on application of the electric field the phase retardation of radiation in adjacent zones differs by $\pi$ radians so that the component constitutes a variable retarder.

Each electrode structure may be in the form of a series of concentric conductive rings. Alternatively, one of the electrode structures may be in the form of a series of conductive parallel lines, the spacing of which varies over said one structure, and the other electrode structure is in the form of a conductive layer covering the corresponding area on the other structure.

A component in accordance with the invention may include means for applying voltages to selected portions of each electrode structure. In such a component the means for applying voltages may be arranged to apply different voltages to different portions of the electrode structures so as to create a desired spatial pattern of phase retardations across the component.

BRIEF DESCRIPTION OF THE DRAWINGS

A number of optical components in accordance with the invention will now be described, by way of example only, with reference to the accompanying drawings in which.

DETAILED DESCRIPTION OF THE PREFERRED EMBODIMENTS

Figure 1:
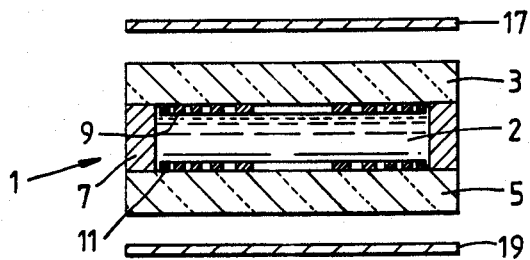
FIG. 1 is a schematic cross-sectional view of a first component in accordance with the invention.
Figure 2:
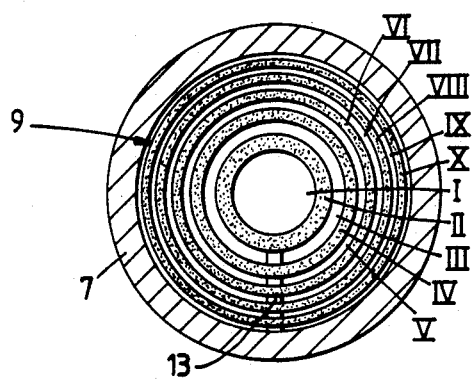
FIG. 2 illustrates an electrode structure carried on a first plate of the first component.
Figure 3:
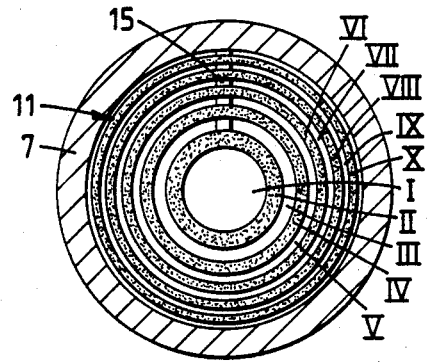
FIG. 3 illustrates an electrode structure carried on a second plate of the first component.

Referring firstly to FIG. 1, the first component to be described includes a liquid crystal cell 1 comprising a twisted nematic liquid crystal 2 contained between two parallel glass plates 3, 5 separated by spacers 7. Each plate 3, 5 carries on its surface adjacent to the liquid crystal 1 a respective electrode structure 9, 11 each in the form of a series of concentric rings of indium tin oxide as best shown in FIGS. 2 and 3. Respective leads 13, 15 are provided to each series of rings, connecting each ring to a voltage source (not shown) the leads being set in opposite directions to avoid their coincidence across the cell. The liquid crystal cell is placed between a pair 17, 19 of crossed polarisers.

In use of the component, the voltage source is used to apply an RMS voltage several times greater than the threshold voltage of the cell between the electrode structures 9, 11. If a light source 25 is placed on the axis of the electrode structures 9, 11 as indicated in FIG. 1, for suitable electrode ring widths and ring spacings the component will act as a spherical zone-plate lens. This phenomenon may be explained as follows: if the electrode structure ring widths and spacings are such that the light path from the source 25 to an observer 0 differs by half the wavelength of the light emitted by the source 25 in adjacent concentric zones across the component defined by the electrode structures, i.e. zones I, II, III, IV, V etc., as indicated in FIGS. 2 and 3, the wavefront of the light transmitted through the cell will be divided into Fresnel zones. When the voltage is applied between the electrode structures 9 and 11 the combination of the twisted nematic liquid crystal 2 and polarisers 17, 19 will cause the component to be nontransmissive to the incident light in alternate Fresnel zones defined by the coincidence of the electrode structures 9, 11. Hence, a zone-plate lens is formed in which the light wave transmitted through the "positive" transmissive zones I, III, V - - - act to reinforce each other, whilst the "negative" nontransmissive zones block the out-of-phase light waves as explained in "Optics" by A. Sommerfield, pages 207 to 219.

It will be appreciated that the dynamic scattering or cholesteric phase-change scattering effects may be used as alternatives to the twisted nematic effect in this component.

It will also be appreciated that the component may alternatively be used as a variable phase retarder lens, this having the advantage over a zone-plate lens that half the incident light is not blocked as it is in the zone-plate lens. The variable phase retarder lens may be achieved by arranging for both plates 3, 5 to impart a tilted homogeneous alignment to a nematic liquid crystal having a positive dielectric anisotropy. Alternatively, both plates 3, 5 may be arranged to impart a tilted homeotropic alignment to a liquid crystal having a negative dielectric anisotropy. In a third alternative, the plate 3 may impart a homogeneous alignment, whilst the plate 5 imparts a homeotropic alignment to a liquid crystal of either anisotropy. The voltage applied between the electrode structures 9, 11 is then chosen such that the phase retardation of the light incident on the component in the "negative" zones II, IV, VI - - - differs from that in the "positive" zones I, III, V - - - by $\pi$ radians.

In such a variable phase retarder, the optical losses due to the polarisers 17, 19 may be avoided by the use of two liquid crystal cells, each of the form shown in FIG. 1, the electrode structures of each cell being identical, but the directions of surface alignment of the liquid crystals 2 in the cells being orthogonal. The polarisers 17, 19 may then be omitted.

Figure 4:
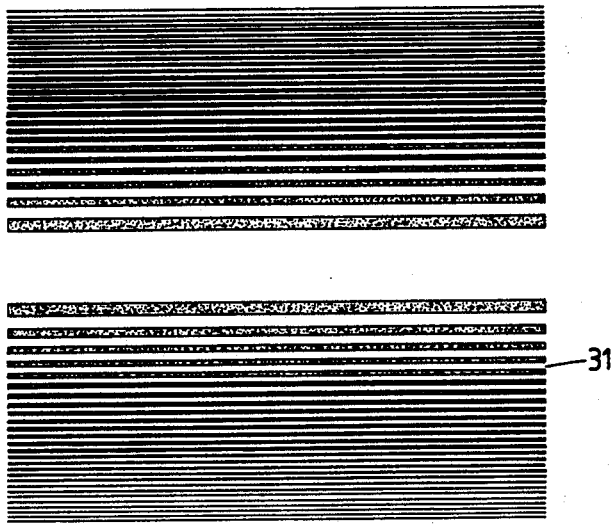
FIG. 4 illustrates the electrode structure carried on a first plate of a second component in accordance with the invention.

By replacing the electrode structure 9 of FIG. 2 by an electrode structure 31 shown in FIG. 4, and replacing the electrode structure 11 of FIG. 3 by a uniform electrode covering the whole active area of the cell 1, a cylindrical lens of analogous operation to that of the spherical lens described herebefore may be formed. As optical components in accordance with the invention are so thin, a pair of orthogonal cylindrical lenses may be used to give the same effect as a spherical lens.

The lenses in accordance with the invention described hereinbefore by way of example can be switched between zero optical power, i.e. the reciprocal of the focal length is zero, and a fixed finite non-zero focal length determined by the spacing of the electrode structures. A variable focal length lens can be obtained by use of electrode structures with finer, uniformly spaced electrodes, selected ones of which are activated by application of the required voltage so as to produce Fresnel zones with a spacing corresponding to the desired focal length.

Figure 5:
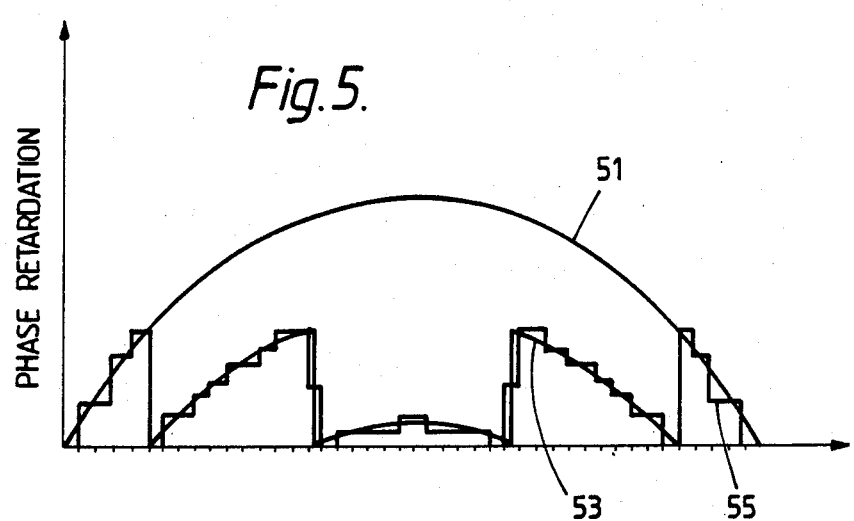
FIG. 5 illustrates the pattern of phase retardations across a third component in accordance with the invention in operation as a Fresnel lens.

Turning now to FIG. 5, using fine, uniformly spaced electrodes as described above either in the form of concentric rings as in the first component described above or straight lines as in the second component described above, a Fresnel lens in accordance with the invention may also be formed. Instead of applying the same RMS voltage to selected ones of the electrodes within the structures, different voltages may be applied to different electrodes in order to create a spatial pattern of phase retardations across the component, in which the transmitted wavefront varies smoothly across each Fresnel zone, and then jumps by a multiple of $2\pi$ radians on passing to the next zone. A curve 51 in FIG. 5 illustrates the relative phase retardation which would be required for a conventional optical component made from a thick piece of refractive material. A curve 53 shows the reduction of this curve by multiples of $2\pi$, whilst a curve 55 shows the corresponding approximation set up by application of appropriate voltages to selected electrodes. By this means a better approximation to the desired wavefront, and a higher quality image with lower achromaticity, are produced than with the zone-plate lenses described above with reference to FIGS. 1, 2, 3, and 4. The voltages applied to the electrodes to achieve the Fresnel lens may be adjusted so as to remove residual aberrations in the image by use of a control loop.

Figure 6:
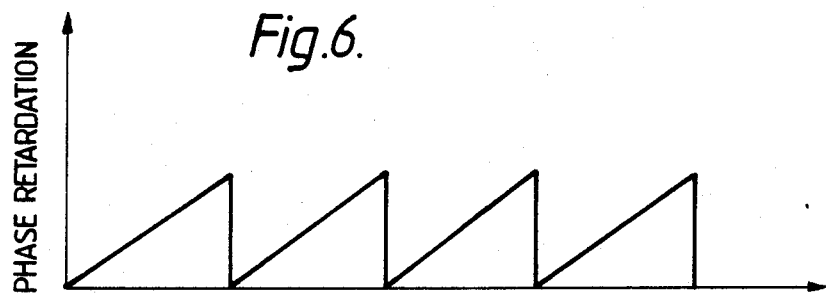
FIG. 6 illustrates the pattern of phase retardations across the third component in operation as a beam deflector.

Referring now also to FIG. 6, by application of suitable voltages to chosen electrodes of the above component so as to generate the saw tooth pattern of phase retardations across the component shown in this figure, an optical component acting as a switchable or variable prism or beam deflector may be realised.

The Fresnel lens as described above has the disadvantages that very finely spaced electrodes subdividing each Fresnel zone must be etched and also that several distinct RMS voltages must be applied to different electrodes so as to generate the required pattern of phase retardations across the above component. The use of such voltages entails the provision of a complex voltage source.

An alternative method of setting up the required variations in voltage is to use electrode structures with spatially-varying resistivity. One method of producing such electrode structures would be to vary the thickness of the indium tin oxide pattern. By use of such electrode structures, the subdivision of each Fresnel zone into many finely spaced electrodes may be avoided. Yet another alternative is to use transparent electrodes with uniform sheet resistance which is very much higher than usual. In this method narrow metallic, e.g. aluminium, electrodes are deposited along two of the edges of each resistive transparent electrode and a voltage gradient is applied across the transparent electrodes by applying different voltages to the bounding metallic electrodes.

It will be appreciated that each of the lenses in accordance with the invention described herebefore will have many applications in optical and imaging equipment. In particular, where they are used in imaging techniques the detection of faint point images against strong background noise may be enhanced by rapidly focussing and defocussing the image at a predetermined frequency by use of a variable focus lens in accordance with the invention. Conventional phase locking techniques may be used to enhance detection.

Figure 7:
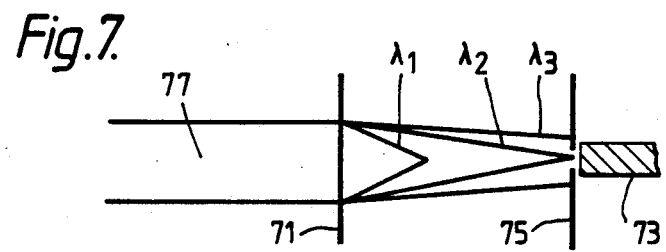
FIG. 7 illustrates a component in accordance with the invention in operation as a spectrometer.

A particular application of zone-plate lens in accordance with the invention as a spectrometer or monochromator is shown in FIG. 7. This figure shows a zone-plate lens 71 placed in front of a photodetector 73, a pin-hole 75 being interposed between the lens 71 and the photodetector 73. As the focal length of a zone-plate lens is inversely proportional to the wavelength of the incident light, the focal position of each wavelength within a collimated polychromatic beam 77 incident on the lens 71 may be adjusted, by means of voltages applied to the lens 71, to coincide in turn with the pin-hole 75. By way of illustration, the figure shows the focussed rays for three wavelengths within the beam 77, where $\lambda_1 > \lambda_2 > \lambda_3$.

Previously, knowledge of the relative spatial phase of a radiation wavefront has involved the use of complex interferometric techniques. Moiré fringes are used extensively for measuring surface imperfections with the aid of such techniques. An alternative technique exists wherein an expensive screen comprising an array of about 100×100 miniature lenses formed by refracting dimples is inserted into a wavefront which has been distorted by reflection from, or transmission through, an imperfect optical surface or material.

Figure 8:
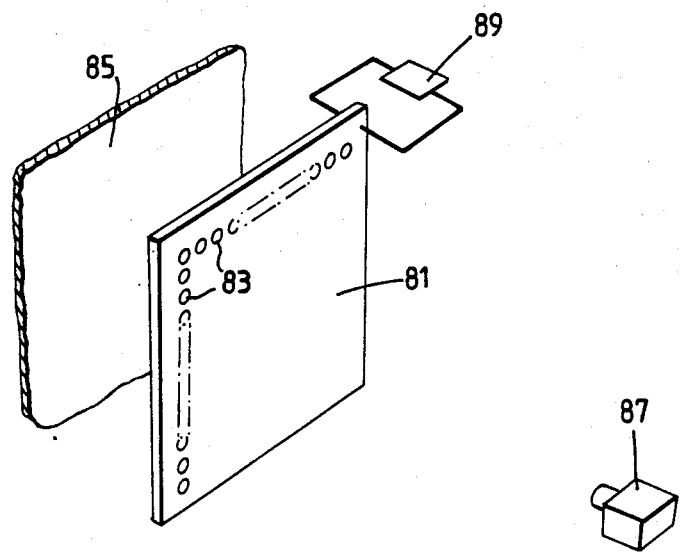
FIG. 8 is a schematic pictorial view of a wavefront analyser incorporating an array of components in accordance with the invention.

FIG. 8 shows a wavefront analyser incorporating an array 81 of n Fresnel phase-changing lenses 83 in accordance with the invention. In the absence of an applied voltage on the lenses, the polarised optical information from such surface or material 85 propagates undisturbed, and a camera 87 can record the scene normally. If a voltage is applied to the lenses from a source 89, a bright reference in the scene will appear replicated n-fold at the camera. The relative compression and rarefaction of the array of images is a direct measure of wavefront phase corruption in the field.

It will be appreciated that whilst all the optical components in accordance with the invention described hereinbefore by way of example incorporate liquid crystal cells in which the plates confining the liquid crystal are made of glass, optical components in accordance with the invention may be designed to operate in the infra-red, and in particular in the 8-14 um waveband if the glass plates are replaced by materials, for example ZnS, ZnSe and Ge, which are transparent to infra-red. Alternatively, the component may be designed for operation in the ultra-violet.

It is an advantage of the invention that the optical parameters are controllable by the application of low voltage (e.g. up to about 10 volts) signals thereto.

It will also be appreciated that the drive circuitry required to apply the necessary electrical signals to the electrode structures of optical components in accordance with the invention may be provided on one or both of the plates confining the liquid crystal, by use of such techniques as bonding of chips, or thin film transistors.

It will be apparent that optical components in accordance with the invention may utilise other liquid crystal electro-optic effects instead of those described above by way of example, to give the desired optical retardations. In particular, faster responding components may be obtained by using the "two-frequency" switching techniques as described by Bucher et al, in Applied Physics Letters, volume 25, pages 186-8, published in 1974, or by using the "pi-cell" configuration as described by Bos et al in Molecular Crystals and Liquid Crystals, volume 113, pages 329-39 published in 1984, or by using ferroelectric smectic liquid crystals as described by Clark and Lagerwall in Applied Physics Letters, volume 36, pages 899-901, published in 1980.

Furthermore, components in accordance with the invention may incorporate other electrically controllable birefringent materials besides liquid crystals, for example Lithium Niobate.

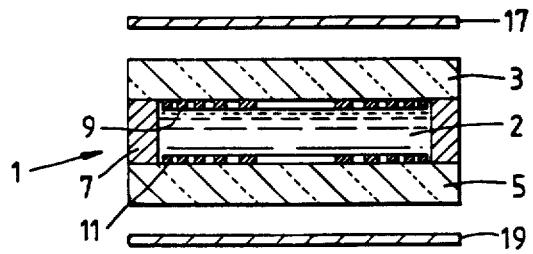

We claim:

1. An electrically-controllable optical component, comprising: two substantially planar surfaces; a thin film of electrically-controllable birefringent material confined between said surfaces, said material having a refractive index; a respective electrode structure on each of said surfaces between which structures a voltage can be applied to apply an electric field across said thin film to cause modulation of said refractive index of said material; said electrode structures being patterned such that when electromagnetic radiation having a wavefront is incident on said component and said voltage is applied between said structures, then said wavefront is divided into Fresnel zones according to phase retardations impressed on said wavefront by said thin film.

2. An optical component according to claim 1, in which the material is a liquid crystal material.

3. An optical component according to claim 1, in which the thin film and the electrode structures are such that, on application of the electric field, alternate Fresnel zones are nontransmissive to said incident radiation such that the component constitutes a zone plate.

4. An optical component according to claim 1, in which the thin film and the electrode structure are such that, on application of the electric field, the phase retardation of radiation in adjacent zones differs by $\pi$ radians so that the component constitutes a variable phase retarder.

5. An optical component according to claim 1, in which each electrode structure is in the form of a series of concentric conductive rings.

6. An optical component according to claim 1, in which one of the electrode structures is in the form of a series of conductive parallel lines, the spacing of which varies over said one structure, and the other electrode structure is in the form of a conductive layer covering the corresponding area on the other structure.

7. An optical component according to claim 1, including means for applying voltages to selected portions of each electrode structure.

8. An optical component according to claim 7, in which the means for applying voltages is arranged to apply different voltages to different portions of the electrode structures so as to create a desired spatial pattern of phase retardations across the component.

9. An optical component according to claim 8, in which at least one electrode structure has a spatially varying resistivity.

10. An optical component according to claim 9, in which the or each electrode structure with varying resistivity has a varying thickness.

11. An optical component according to claim 8, in which said one electrode structure with varying resistivity has a high resistivity, and the means for applying voltages applies different voltages to the boundary portions of said one electrode structure such that a voltage gradient across said one electrode structure is produced.

12. A spectrometer, comprising an optical component as claimed in claim 3; means to direct a collimated polychromatic light beam at the component; a photodetector disposed to receive light after passage through the optical component and through a pin-hole adjacent the photodetector; and means to apply an adjustable voltage to the component, whereby adjustment of the voltage allow light of different wavelengths to be focussed selectively at the photodetector.

13. A wavefront analyser, comprising an array of optical components as claimed in claim 1 for receiving radiation from an object; a camera for recording a pattern of light passing through the optical components; and means to apply a voltage to the optical components whereby the components each produce an image of a point on the object.

* * * * *

UNITED STATES PATENT AND TRADEMARK OFFICE
CERTIFICATE OF CORRECTION

PATENT NO. : 4,909,626

DATED : March 20, 1990

INVENTOR(S) : Alan Purvis, et al.

It is certified that error appears in the above-identified patent and that said Letters Patent is hereby corrected as shown below:

The title page showing the illustrative figure should be deleted to be replaced with the attached title page.

Signed and Sealed this

Ninth Day of February, 1993

Attest:

STEPHEN G. KUNIN

Attesting Officer

Acting Commissioner of Patents and Trademarks

United States Patent [19]

Purvis et al.

[11] Patent Number: 4,909,626
[45] Date of Patent: Mar. 20, 1990

[54] ELECTRICALLY-CONTROLLABLE THIN FILM FRESNEL ZONE DEVICE

[75] Inventors: Alan Purvis, Durham; Michael G. Clark, Gerrards Cross, both of Great Britain

[73] Assignee: The General Electric Company, p.l.c., United Kingdom

[21] Appl. No.: 344,059

[22] Filed: Apr. 27, 1989

Related U.S. Application Data

[63] Continuation of Ser. No. 78,220, Jul. 27, 1987, abandoned.

[30] Foreign Application Priority Data

Jul. 28, 1986 [GB] United Kingdom ............... 8618345

[51] Int. Cl.⁴ .......................... G01J 3/06; G01J 3/14; G02F 1/133
[52] U.S. Cl. .................................. 356/332; 350/336; 350/347 V; 350/379
[58] Field of Search .......... 356/332; 350/336, 347 V, 350/379, 452

[56] References Cited

U.S. PATENT DOCUMENTS

| | | | |
|---|---|---|---|
| 3,402,001 | 9/1986 | Fleisher | 350/379 |
| 3,588,225 | 6/1971 | Nicastro | 350/336 X |
| 3,653,742 | 4/1972 | Buchan | |
| 4,367,916 | 1/1983 | Mottier et al. | 350/452 X |
| 4,572,616 | 2/1986 | Kowel et al. | 350/347 V |
| 4,601,545 | 7/1986 | Kern | 350/347 V |
| 4,606,612 | 8/1986 | Iizuka | 350/347 V |
| 4,639,091 | 1/1987 | Hulgnard et al. | 350/347 V |

FOREIGN PATENT DOCUMENTS

| | | |
|---|---|---|
| 0121449 | 10/1984 | European Pat. Off. |
| 2325954 | 4/1977 | France |
| 8505466 | 12/1985 | PCT Int'l Appl. |
| 1026318 | 4/1966 | United Kingdom |
| 1061257 | 3/1967 | United Kingdom |
| 1193228 | 5/1970 | United Kingdom |

OTHER PUBLICATIONS

Hirsch et al., "Scanning Monochromator" IBM Tech. Disc. Bulletin, vol. 12, No. 11, Apr. 1970, pp. 1806.
Patent Abstracts of Japan, vol. 10, No. 6, A-6.020402 (Matsushita Denki Sangyo K.K.). IEEE Transactions of Electron Devices, col. Ed-26, No. 11, Nov. 79, pp. 1734-1737, Hori et al., "Field-Controllable Liquid Crystal Phase Granting".

Primary Examiner—Vincent P. McGraw
Attorney, Agent, or Firm—Kirschstein, Ottinger, Israel & Schiffmiller

[57] ABSTRACT

An optical component comprises a thin film of an electrically controllable birefringent material confined between substantially planar surfaces. A respective electrode structure is provided on each of the surfaces, each electrode structure being patterned such that an electric field applied across the film by means of electrode structures, when a voltage is applied therebetween, causes modulation of the refractive index of the material such that the wavefront of electromagnetic radiation incident of the component and transmitted through the thin film is divided into Fresnel zones.

13 Claims, 3 Drawing Sheets